United States Patent [19]

Leigh-Monstevens et al.

[11] Patent Number: 4,949,827

[45] Date of Patent: Aug. 21, 1990

[54] CONCENTRICALLY MOUNTED HYDRAULIC CLUTCH ACTUATOR

[75] Inventors: Keith V. Leigh-Monstevens, Troy; David L. Wrobleski, Fraser, both of Mich.

[73] Assignee: Automotive Products plc, Warwickshire, England

[21] Appl. No.: 206,657

[22] Filed: Jun. 15, 1988

Related U.S. Application Data

[63] Continuation-in-part of Ser. No. 153,512, Feb. 18, 1988, which is a continuation of Ser. No. 921,762, Oct. 22, 1986, abandoned.

[51] Int. Cl.$^5$ .................. F16D 23/14; F16D 25/08
[52] U.S. Cl. .................. 192/85 CA; 192/91 A; 192/98; 92/117 A
[58] Field of Search .................. 192/85 CA, 91 A, 98, 192/110 B; 92/117 A

[56] References Cited

U.S. PATENT DOCUMENTS

| | | | |
|---|---|---|---|
| 2,089,472 | 8/1937 | Geyer | 192/70.17 |
| 2,388,857 | 11/1945 | Lindsley | 192/85 CA |
| 2,550,373 | 4/1951 | Ortloff et al. | 192/86 |
| 2,717,680 | 9/1955 | Smith | 192/91 A |
| 3,045,790 | 7/1962 | Becker | 192/38 |
| 3,474,888 | 10/1969 | Carlson et al. | 192/91 A |
| 3,955,660 | 5/1976 | Poon et al. | 192/91 A |
| 4,366,890 | 1/1983 | Suckow | 192/85 CA |
| 4,620,625 | 11/1986 | Ladin | 192/85 CA |

FOREIGN PATENT DOCUMENTS

| | | |
|---|---|---|
| 2923487 | 12/1980 | Fed. Rep. of Germany . |
| 2194263 | 2/1974 | France . |
| 2395429 | 1/1979 | France . |
| 1168926 | 10/1969 | United Kingdom . |
| 1298310 | 11/1972 | United Kingdom . |
| 1323794 | 7/1973 | United Kingdom . |
| 1362500 | 8/1974 | United Kingdom . |
| 1550860 | 8/1979 | United Kingdom . |
| 2046864 | 11/1980 | United Kingdom . |
| 2088010 | 6/1982 | United Kingdom . |
| 2116283 | 9/1983 | United Kingdom . |
| 2174169 | 10/1986 | United Kingdom . |

*Primary Examiner*—Richard Lorence
*Attorney, Agent, or Firm*—Krass and Young

[57] ABSTRACT

A concentric hydraulic actuator for use with a manual transmission motor vehicle of the type in which the actuator housing moves in response to depression of the clutch pedal and the associated piston remains axially affixed. The housing of the actuator includes an outer main body portion defining an annular piston bore opening rearwardly and further defines an inner bearing carrier section including a hub portion slidably guiding on the associated quill shaft surrounding the transmission input shaft and interconnected to the main body outer portion of the housing by a radially extending web portion joined at its outer periphery to the inner periphery of the inner annular wall portion defining the piston bore at a location thereon spaced axially rearwardly from the forward end of the inner wall portion and joined at its inner periphery to the outer periphery of the hub portion at a location thereon spaced axially rearwardly from the forward end of the hub portion so as to define a forwardly opening bearing cavity in which the release bearing is received for coaction with the release element of the associated clutch. The hub portion of the bearing carrier, the release bearing, and the annular piston bore are arranged in concentric axially overlapping relationship to minimize the axial dimension of the actuator.

12 Claims, 1 Drawing Sheet

U.S. Patent   Aug. 21, 1990   4,949,827
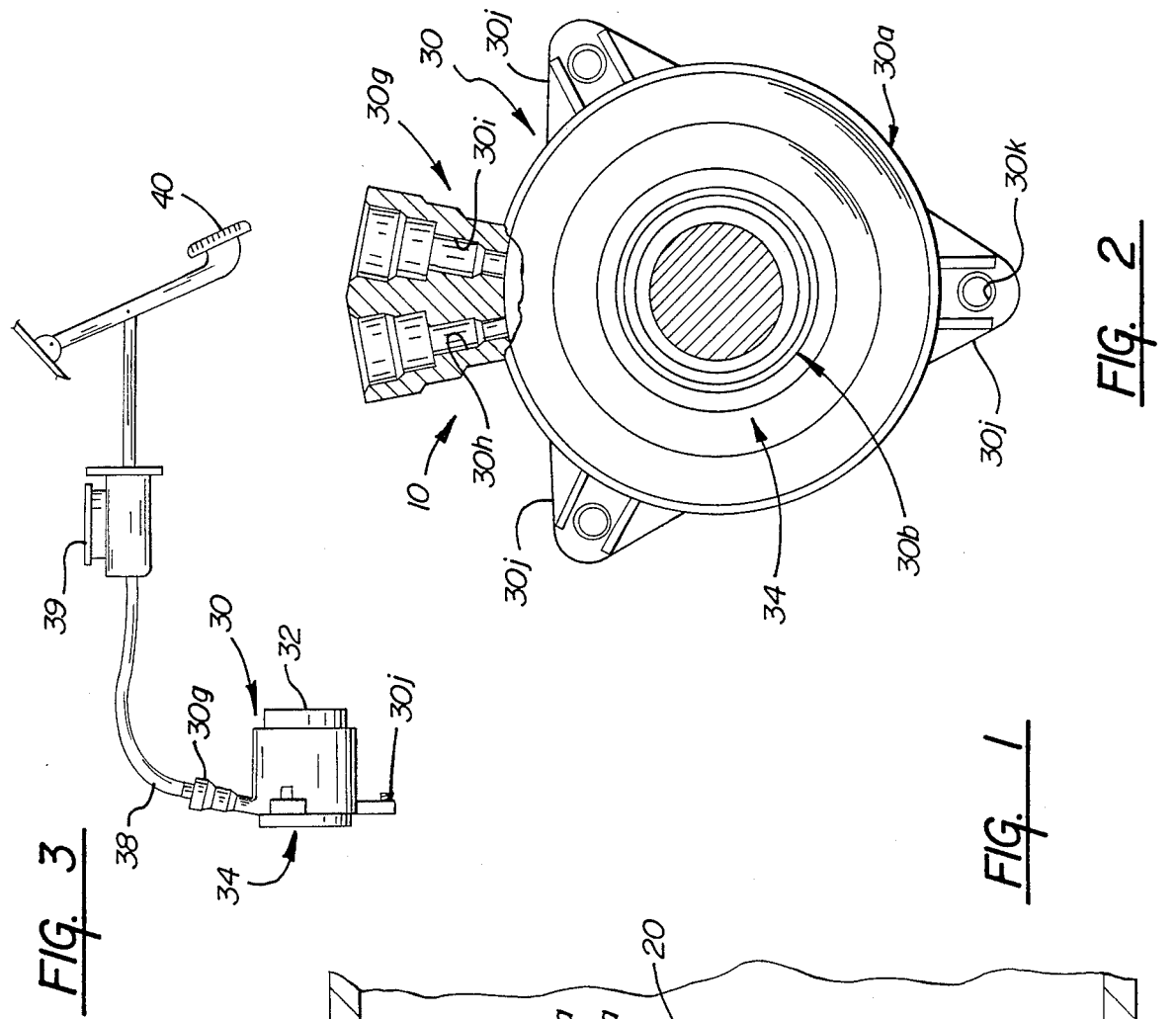
*FIG. 1*
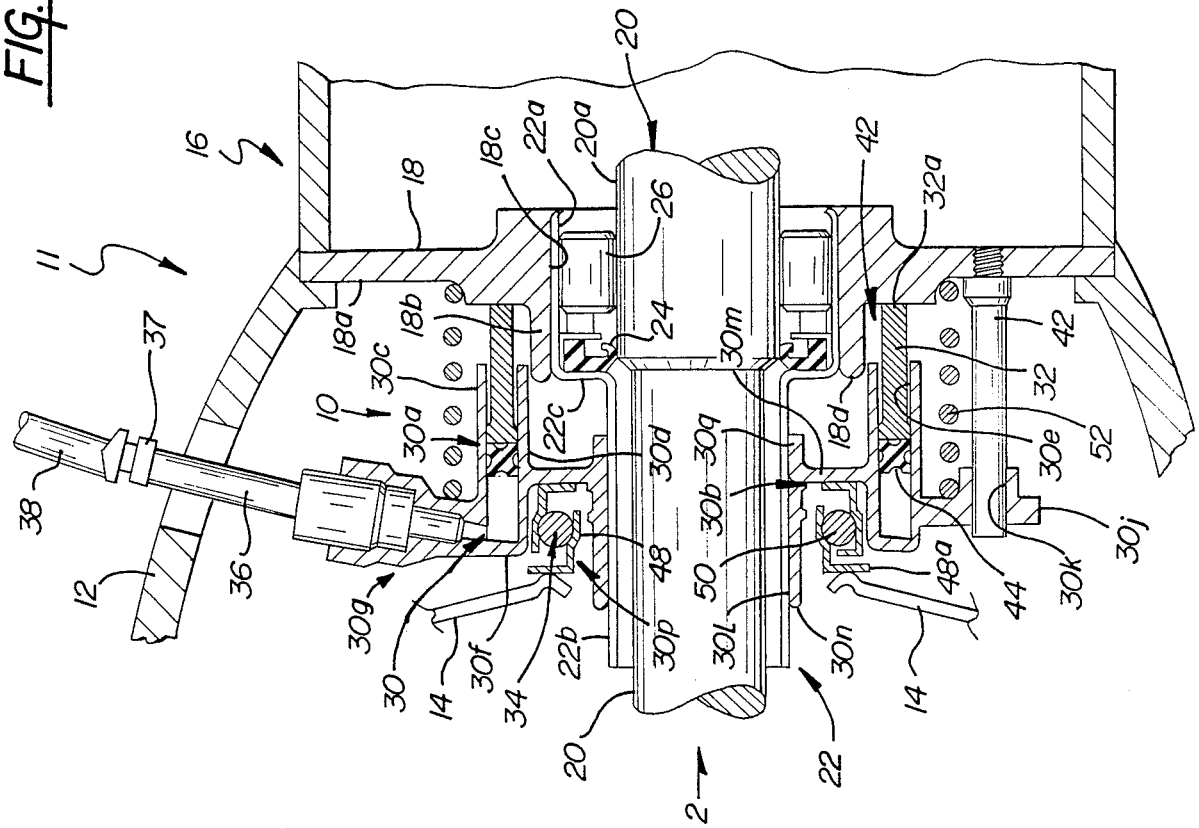
*FIG. 2*
*FIG. 3*

CONCENTRICALLY MOUNTED HYDRAULIC CLUTCH ACTUATOR

RELATED APPLICATION

This application is a continuation-in-part of U.S. patent application Ser. No. 153,512 filed on Feb. 18, 1988 which is a continuation of U.S. patent application Ser. No. 921,762 filed on Oct. 22, 1986.

FIELD OF THE INVENTION

This invention relates to a hydraulic clutch actuator for use with motor vehicles having manual transmissions. More specifically, this invention relates to a hydraulic actuator adapted to be mounted within the clutch housing of a manual transmission vehicle in concentric relation to the transmission input shaft interconnecting the clutch and the transmission.

BACKGROUND OF THE INVENTION

The clutch actuator for manual transmission motor vehicles comprises a selectively displacable element which is connected to the release element of the clutch assembly to separate two rotatable elements of the clutch, which elements are normally frictionally coupled to transfer energy from the engine crank shaft to the transmission input shaft. In the case of a hydraulic actuator, the actuator comprises the slave portion of a hydraulic master cylinder/slave cylinder assembly wherein the master cylinder is mounted to be directly operated by the clutch pedal.

As is well known, the release element of the clutch rotates at engine speed when the clutch is engaged and slows down and may eventually stop when the clutch is released or disengaged to permit a gear change. The actuator on the other hand is nonrotating, that is, the body of the actuator must be secured against rotation to a structural component such as a transmission housing or the clutch housing. Therefore, the clutch actuator must be connected to the release element through a bearing commonly called a throw out or a release bearing.

The actuator can be mounted off axis or externally relative to the transmission input shaft or it can be mounted concentrically. The off axis or external arrangement involves a lever arm connected between the actuator output element and the clutch release member. The typical concentric arrangement requires no such lever arm. Instead, the cylinder body of the actuator is fixed to the clutch bell housing or to the face of the transmission housing and the axially translatable piston is connected to the outer race of the throw out bearing. The inner race is in turn connected to the clutch release element. Examples of concentric actuator arrangements are shown for example in U.S. Pat. Nos. 4,585,106; 4,585,107; 4,585,108, 4,585,109; 4,609,087; 4,624,290; 4,660,694; 4,684,003; 4,687,084 and 4,708,228 all assigned to the assignee of the present invention.

Whereas these prior art concentric actuators are satisfactory in most applications, there are certain applications where the size and/or profile of the prior art actuators present problems with respect to installation and/or operation.

SUMMARY OF THE INVENTION

This invention is directed to the provision of a concentric clutch actuator which can be easily located and mounted in concentric relationship to the input shaft of the transmission as an assembled unit ready to receive the clutch component and which offers both increased axial compactness and easier installation as advantages over the prior art.

The actuator of the invention is intended for use with a clutch having a clutch housing and clutch release element, a transmission, and a transmission input shaft drivingly interconnecting the clutch and the transmission. The invention actuator is of the type in which the actuator body translates axially during clutch release and engagement with the piston of the actuator remaining axially fixed during the release and engagement operations. According to the invention, the actuator includes a quill shaft fixedly positioned relative to the front face of the transmission housing and extending forwardly from the front face in concentrically surrounding but radially spaced relation to the transmission input shaft; an actuator housing adapted to be positioned within the clutch housing in concentric relation to the transmission input shaft and including an annular bearing carrier section having an axially extending annular hub portion slidably mounted on the quill shaft so as to mount the housing for axial sliding movement along the quill shaft and an annular main body section defining a rearwardly opening annular piston bore spaced radially outwardly from the bearing carrier section hub portion to define an annular area concentrically therebetween; a release bearing mounted on the bearing carrier proximate the annular area between the piston bore and the hub portion of the bearing carrier section; an annular piston sized to fit at its forward end in the piston bore and bearing at its rearward end against the front face of the transmission housing; and means for delivering hydraulic pressure fluid to the piston bore so as to move the actuator housing axially forwardly relative to the transmission input shaft with the axial movement guided by the sliding engagement of the bearing carrier section hub portion on the quill shaft so as to move the clutch release element to a clutch disengaged position by the intermediary of the release bearing. This arrangement provides an axially compact actuator construction.

According to a further feature of the invention, the annular area between the piston bore and the hub portion of the carrier section is defined by a forwardly opening annular bearing bore between the hub portion of the bearing carrier and the piston bore, and the release bearing is mounted in the bearing bore. This arrangement provides a convenient and compact mounting structure for the release bearing.

According to a further feature of the invention, the piston bore and the carrier section hub portion are axially overlapping. This axial overlap further contributes to the axial compactness of the invention actuator.

In the disclosed embodiment of the invention, the actuator housing main body section includes radially spaced concentric inner and outer annular piston bore wall portions defining the piston bore therebetween; the bearing carrier section includes the axially extending hub portion and a radially extending web portion connected at its outer periphery to the inner periphery of the inner piston bore wall portion at a location thereon spaced axially rearwardly from the forward end of the inner wall portion and connected at its inner periphery to the outer periphery of the hub portion at a location thereon spaced axially rearwardly from the forward end of the hub portion so as to define a forwardly opening bearing cavity defined by the inner periphery of the piston inner wall portion, the front annular face of the web portion, and the outer periphery of the hub portion; and the release bearing is mounted in the bearing cavity. This specific housing construction provides an inexpensive, axially compact and effective hydraulic actuator construction.

According to a further feature of the invention, the hub portion extends axially rearwardly beyond the rear annular face of the web portion to maximize the annular axial guiding inner face between the hub portion and the quill shaft and thereby provide positive sliding guidance for the actuator housing.

BRIEF DESCRIPTION OF THE DRAWINGS.

FIG. 1 is a cross-sectional, somewhat schematic view of the invention actuator;

FIG. 2 a view looking in the direction of the arrow 2 in FIG. 1 with certain elements eliminated for purposes of clarity; and FIG. 3 a schematic view of a prefilled assembly including the invention actuator.

DETAILED DESCRIPTION OF THE PREFERRED EMBODIMENT

The invention hydraulic actuator 10 is seen in FIG. 1 in association with a manual transmission motor vehicle of the type including a clutch 11 having a bell housing 12 and a plurality of diaphragm spring fingers 14; a transmission 16 including a transmission housing having a front plate 18 defining a front face 18a; and a transmission input shaft 20 drivingly interconnecting the clutch and the transmission in known manner in response to selective engagement and disengagement of the clutch through the intermediary of the diaphragm spring fingers 14 acting as a release element for the clutch.

Transmission front plate 18 includes a central forwardly extending hub portion 18b defining a central bore 18c. A quill shaft 22 is press fit within the bore 18c of the front transmission plate 18.

Quill shaft 22 includes an enlarged rearward portion 22a press fit within bore 18c and a forwardly extending guide portion 22b extending forwardly from enlarged portion 22a in concentrically surrounding and radially spaced relation to transmission input shaft 20 and joined to enlarged portion 22a by an annular shoulder 22c. A shaft seal 24 is positioned within enlarged quill shaft portion 22a in sealing engagement with an enlarged portion 20a of the transmission input shaft, and roller bearings 26 are also positioned within enlarged portion 22a of the quill shaft to provide bearing support for the transmission input shaft. Quill shaft 22 is preferably configured such that annular shoulder 22c is essentially flush with the forward edge of transmission front plate hub portion 18b.

Actuator 10 includes an actuator housing 30, an annular piston 32, and a release bearing 34.

Housing 30 is preferably formed of a plastic material and includes an outer main body portion 30a and a concentrically inner bearing carrier portion 30b.

Main body section 30a includes radially spaced inner and outer annular wall portions 30c and 30d defining a rearwardly opening piston bore 30e therebetween closed by a forward annular end wall 30f of the main body section. Main body section 30a further includes a fitting 30g extending radially outwardly from the housing and defining a pair of passages 30h and 30i communicating with piston bore 30e. Passage 30i communicates with a conduit 36 terminating in a vent 37 and passage 30h communicates with a conduit 38 which passes through a suitable opening in clutch bell housing 12 for connection to the discharge port of an associated master cylinder 39 so that pressure hydraulic fluid discharged from the master cylinder in response to operator depression of the associated clutch pedal 40 will deliver pressurized fluid through conduit 38 and through passage 30h to piston bore 30e. Master cylinder 39, conduit 38 and actuator 10 are prefilled with hydraulic fluid and delivered to the motor vehicle manufacturer as a prefilled assembly for installation on the motor vehicle during the vehicle assembly process.

Housing main body section 30a further includes a plurality of lugs or flanges 30j spaced circumferentially around the housing and each defining a bore 30k for receipt of the forward end of a guide pin 42 threadably received at its rearward end in transmission housing front plate 18 so as to preclude rotation of housing 30 relative to the transmission housing.

Inner bearing carrier section 30b of housing 30 includes an annular axially extending hub portion 30l slidably mounted on quill shaft guide portion 22b and a radially extending annular web portion 30m. Web portion 30m is joined at its outer periphery to the inner periphery of inner annular wall portion 30d at a location thereon spaced axially rearwardly from the forward end of inner wall portion 30d and is joined at its inner periphery to the outer periphery of hub portion 30l at a location thereon spaced axially rearwardly from the forward end 30n of the hub portion so as to define a forwardly opening annular cavity 30p defined by the inner periphery of the inner wall portion 30d forwardly of web portion 30m, the front annular face of web portion 30m, and the outer periphery of hub portion 30l forwardly of web portion 30m. Hub portion 30l also includes a portion 30q extending axially rearwardly beyond the rear annular face of web portion 30m to maximize the annular axial guiding interface between the hub portion and the quill shaft guide portion 22b.

Annular piston 32 is preferably formed of a suitable plastic material and is sized to fit at its forward end in piston bore 30e and bear at its rearward end 32a against the transmission housing front face 18a at a location thereon spaced radially outwardly from hub portion 18b and defining an annular space 42 between the piston and hub portion 18b. An annular seal 44 positioned within bore 30e forwardly of the front end of piston 32 precludes leakage of hydraulic fluid out of bore 30e.

Release bearing 34 is mounted in annular bearing cavity 30p and includes a fixed outer race 46 secured to housing web portion 30m, a rotatable inner race 48 having a radially extending flange portion 48a for engagement with diaphragm spring fingers 14, and a plurality of ball bearings 50. When installed in association with the clutch and transmission of the associated motor vehicle, housing hub portion 30l guides tightly but slidably on quill shaft guide portion 22b, annular piston 32 bears against the front face 18a of the front plate 18 of the transmission housing, and release bearing 34 is maintained in a preloaded condition relative to spring fingers 14 by a coil preload spring 52 encircling outer housing wall 30c and bearing at its rearward end against the front face 18a of the transmission housing and against lugs 30j and fitting 30g at its forward end so as to function to constantly preload the release bearing. Note that in the installed position of the invention actuator, the inner housing wall 30d defining the inner periphery of the piston bore 30e is positioned in telescopic relation to transmission housing front plate hub portion 18b in alignment with annular space 42.

The invention actuator is seen in FIG. 1 in a clutch engaged position in which power is being transmitted from the clutch through the transmission input shaft 20 to the transmission. To disengage the clutch and interrupt the transmission of power between the clutch and the transmission, pressure fluid is delivered to piston cavity 30e in response to operator depression of clutch pedal 40 to deliver pressure fluid through conduit 38 from master cylinder 39. The pressurized fluid delivered to bore 30e acts on piston 32 and has the effect of moving the housing 30 forwardly or to the left as viewed in FIG. 1 so as to move the diaphragm spring fingers 14 to a clutch disengaged position through the intermediary of release bearing 34. Following release of the clutch pedal by the vehicle operator, the invention actuator returns to the position seen in FIG. 1. As wear occurs in the clutch over a sustained period of vehicle usage, the position of the clutch actuator corresponding to clutch engagement gradually moves rearwardly relative to the transmission housing with the rear edge of the inner housing wall 30d moving further and further rearwardly into the annular space 42 as wear progressively occurs in the clutch with the limit of wear that the invention actuator can accommodate being determined by the ultimate abutting engagement of the rear edge of housing annular walls 30c and 30d with the front face 18a of the transmission housing.

The invention hydraulic actuator will be seen to provide an extremely axially compact actuator assembly. Specifically, since the hub portion of the bearing carrier, the bearing itself, and the annular bore receiving the piston are arranged in concentric axially overlapping relationship, the overall axial dimension of the actuator is minimized without detracting from the operational effectiveness of the actuator.

Whereas a preferred embodiment of the invention has been illustrated and described in detail, it will be apparent that various changes may be made in the disclosed embodiment without departing from the scope or spirit of the invention.

We claim:

1. A hydraulic apparatus for use with a clutch having a clutch housing and a clutch release element, a transmission including a transmission housing positioned rearwardly of the clutch and having a front face, and a transmission input shaft drivingly interconnecting the clutch and the transmission, said apparatus comprising:
   (A) a quill shaft fixedly positioned relative to the front face of the transmission housing and extending forwardly from the front face in concentrically surrounding but radially spaced relation to the transmission input shaft;
   (B) a clutch actuator housing adapted to be positioned within the clutch housing in concentric relation to the transmission input shaft and including an annular bearing carrier section having an axially extending annular hub portion slidably mounted on said quill shaft so as to mount said housing for axial sliding movement along said quill shaft, an annular main body section including radially spaced inner and outer annular wall portions defining a rearwardly opening annular piston bore spaced radially outwardly from said bearing carrier section hub portion to define an annular area concentrically between the radially outer surface of said hub portion and the radially inner surface of said inner annular wall portion;
   (C) a release bearing mounted on said bearing carrier section proximate said annular area;
   (D) an annular piston fitted at its forward end in said piston bore and bearing at its rearward end against the transmission housing front face; and
   (E) means for delivering hydraulic pressure fluid to said piston bore so as to move said actuator housing axially forward relative to the transmission input shaft with the axial movement guided by the sliding engagement of said bearing carrier section hub portion on said quill shaft, whereby to move the clutch release element to a clutch disengaged position though the intermediary of said release bearing.

2. A hydraulic apparatus for use with a clutch having a clutch housing and a clutch release element, a transmission including a transmission housing positioned rearwardly of the clutch and having a front face, and a transmission input shaft drivingly interconnecting the clutch and the transmission, said apparatus comprising:
   (A) a quill shaft fixedly positioned relative to the front face of the transmission housing and extending forwardly from the front face in concentrically surrounding but radially spaced relation to the transmission input shaft;
   (B) a clutch actuator housing adapted to be positioned within the clutch housing in concentric relation to the transmission input shaft and including an annular bearing carrier section having an axially extending annular hub portion slidably mounted on said quill shaft so as to mount said housing for axial sliding movement along said quill shaft, an annular main body section defining a rearwardly opening annular piston bore spaced radially outwardly from said bearing carrier section hub portion, and means defining a forwardly opening annular bearing bore between said bearing carrier hub portion and said piston bore;
   (C) a release bearing mounted on said bearing carrier section in said bearing bore;
   (D) an annular piston fitted at its forward end in said piston bore and bearing at its rearward end against the transmission housing front face; and
   (E) means for delivering hydraulic pressure fluid to said piston bore so as to move said actuator housing axially forward relative to the transmission input shaft with the axial movement guided by the sliding engagement of said bearing carrier section hub portion on said quill shaft whereby to move the clutch release element to a clutch disengaged position through the intermediary of said release bearing.

3. A hydraulic apparatus for use with a clutch having a clutch housing and a clutch release element, a transmission including a transmission housing positioned rearwardly of the clutch and having a front face and a transmission input shaft drivingly interconnecting the clutch and the transmission, said apparatus comprising:
   (A) a quill shaft fixedly positioned relative to the front face of the transmission housing and extending forwardly from the front face in concentrically surrounding but radially spaced relation to the transmission input shaft;
   (B) a clutch actuator housing adapted to be positioned within the clutch housing in concentric relation to the transmission input shaft and including an annular bearing carrier section having an axially extending annular hub portion slidably mounted on said quill shaft so as to mount said housing for axial sliding movement along said quill shaft, and an annular main body section defining a rearwardly opening annular piston bore axially overlapping said carrier hub portion and spaced radially outwardly from said bearing carrier section hub portion to define an annular area concentrically between the radially outer surface of said hub portion and the radially inner surface of said inner annular wall portion;

(C) a release bearing mounted on said bearing carrier section proximate said annular area;

(D) an annular piston fitted at its forward end in said piston bore and bearing at its rearward end against the transmission housing front face; and (E) means for delivering hydraulic pressure fluid to said piston bore so as to move said actuator housing axially forward relative to the transmission input shaft with the axial movement guided by the sliding engagement of said bearing carrier section hub portion on said quill shaft, whereby to move the clutch release element to a clutch disengaged position through the intermediary of said release bearing.

4. A hydraulic apparatus for use with a clutch having a clutch housing and a clutch release element, a transmission including a transmission housing positioned rearwardly of the clutch and having a front face, and a transmission input shaft drivingly interconnecting the clutch and the transmission, said apparatus comprising:

(A) a quill shaft fixedly positioned relative to the front face of the of the transmission housing and extending forwardly from the front face in concentrically surrounding but radially spaced relation to the transmission input shaft;

(B) a clutch actuator housing adapted to be positioned within the clutch housing in concentric relation to the transmission input shaft and including an annular bearing carrier section having an axially extending annular hub portion slidably mounted on said quill shaft so as to mount said housing for axial sliding movement along said quill shaft, and an annular main body section defining a rearwardly opening annular piston bore spaced radially outwardly from said bearing carrier section hub portion;

(C) an annular piston fitted at its forward end in said piston bore and bearing at its rearward end against the transmission housing front face;

(D) means for delivering hydraulic pressure fluid to said piston bore so as to move said actuator housing axially forward relative to the transmission input shaft with the axial movement guided by the sliding engagement of said bearing carrier section hub portion on said quill shaft, whereby to move the clutch release element to a clutch disengaged position through the intermediary of said release bearing;

(E) said actuator housing main body section including radially spaced concentric inner and outer annular piston bore wall portions defining said piston bore therebetween;

(F) said bearing carrier section including said axially extending hub portion and a radially extending annular web portion defining front and rear annular faces and connected at its outer periphery to the inner periphery of said inner piston wall portion at a location thereon spaced axially rearwardly from the forward end of said inner piston wall portion and connected at its inner periphery to the outer periphery of said hub portion at a location thereon spaced axially rearwardly from the forward end of said hub portion so as to define a forwardly opening annular bearing cavity defined by the inner periphery of said inner piston bore wall portion, the front annular face of said web portion, and the outer periphery of said hub portion; and (G) a release bearing mounted on said bearing carrier section in said bearing cavity.

5. A hydraulic actuator according to claim 4 wherein:

(H) said hub portion includes a portion extending axially rearwardly beyond the rear annular face of said web portion to maximize the annular axial guiding interface between said hub portion and said quill shaft.

6. A hydraulic apparatus for use with a clutch having a clutch housing and a clutch release element, a transmission including a transmission shaft and a transmission housing positioned rearwardly of the clutch and having a front face, and a quill shaft extending forwardly from the front face of the transmission housing in surrounding relation to the transmission input shaft, said apparatus including:

(A) a clutch actuator housing adapted to be positioned within the clutch housing in concentric relation to the transmission input shaft and including an outer main body section including radially spaced inner and outer annular wall portions defining a rearwardly opening piston bore, and an inner bearing carrier section including an annular axially extending annular hub portion axially overlapping said piston bore and adapted to be slidably mounted on the quill shaft to mount the actuator housing for axial slidable movement on the quill shaft and a radially extending annular web portion connected at its outer periphery to the inner periphery of said inner annular wall portion at a location thereon spaced axially rearwardly from the forward end of said inner wall portion and connected at its inner periphery to the outer periphery of said hub portion at a location thereon spaced axially rearwardly from the forward end of said inner wall portion and connected at its inner periphery to the outer periphery of said hub portion at a location thereon spaced axially rearwardly from the forward end of said hub portion so as to define a forwardly opening annular bearing cavity defined by the inner periphery of said inner wall portion, the front annular face of said web portion, and the outer periphery of said hub portion;

(B) a release bearing mounted in said bearing cavity for coaction with the clutch release element;

(C) an annular piston received at its forward end in said piston bore and adapted to bear at its rearward end against the front face of the transmission housing; and (D) means for delivering hydraulic pressure fluid to said piston bore so as to move said actuator housing axially forwardly relative to the transmission input shaft with the axial movement guided by the sliding engagement of said hub portion with the quill shaft, whereby to move the clutch release element to a clutch disengaged position through the intermediary of said release bearing.

7. A hydraulic apparatus according to claim 6 wherein:
(E) said hub portion of said carrier section includes a portion extending rearwardly from said web portion to provide further sliding interface with the quill shaft.

8. An apparatus according to claim 6 wherein:
(E) said inner and outer annular wall portions of said main body section include portions extending rearwardly with respect to said web portion.

9. An apparatus according to claim 8 wherein:
(F) said hub portion also includes a portion extending rearwardly from said web portion to define the rear edge of said hub portion.

10. An apparatus according to claim 9 wherein:
(G) said inner and outer annular wall portions extend rearwardly to a location rearwardly of the rear edge of said hub portion.

11. An apparatus according to claim 6 wherein:
(E) said outer body main section further includes means defining a plurality of circumferentially spaced guide bores for sliding receipt of the front ends of guide pins secured to the front face of the transmission housing to preclude rotation of said housing.

12. An apparatus according to claim 11 wherein:
(F) said guide bores are respectively formed in a plurality of circumferentially spaced lugs extending radially outwardly from said outer wall portion of said main body section.

* * * * *